US008744467B2

(12) United States Patent
Hosono et al.

(10) Patent No.: US 8,744,467 B2
(45) Date of Patent: Jun. 3, 2014

(54) MOBILE COMMUNICATION SYSTEM, HOME RADIO BASE STATION, AND OPERATIONAL FREQUENCY DETERMINATION METHOD

(75) Inventors: Hiroyuki Hosono, Yokohama (JP); Kenichiro Aoyagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/509,464

(22) PCT Filed: Nov. 9, 2010

(86) PCT No.: PCT/JP2010/069943
§ 371 (c)(1),
(2), (4) Date: Jun. 15, 2012

(87) PCT Pub. No.: WO2011/058972
PCT Pub. Date: May 19, 2011

(65) Prior Publication Data
US 2012/0282940 A1    Nov. 8, 2012

(30) Foreign Application Priority Data

Nov. 11, 2009   (JP) ................................. 2009-258276

(51) Int. Cl.
*H04W 74/00*    (2009.01)
(52) U.S. Cl.
USPC ......................... 455/452.1; 455/450; 370/329
(58) Field of Classification Search
USPC .............. 455/411, 424, 436–437, 450, 452.1; 370/328–330
See application file for complete search history.

(56) References Cited

U.S. PATENT DOCUMENTS

| 2008/0102794 | A1* | 5/2008 | Keevill et al. ................. 455/411 |
| 2008/0267114 | A1 | 10/2008 | Mukherjee et al. |
| 2009/0092078 | A1* | 4/2009 | Czaja et al. ................... 370/328 |
| 2009/0098871 | A1 | 4/2009 | Gogic |
| 2010/0111013 | A1* | 5/2010 | Chou ............................ 370/329 |
| 2010/0113029 | A1* | 5/2010 | Bjorken ........................ 455/437 |

(Continued)

FOREIGN PATENT DOCUMENTS

| JP | 8 23566 | 1/1996 |
| JP | 2009 71420 | 4/2009 |

(Continued)

OTHER PUBLICATIONS

3GPP TS 22.220 V11.4.0, "3rd Generation Partnership Project; Technical Specification Group Services and System Aspects; Service requirements for Home Node B (HNB) and Home eNode B (HeNB)," Total 25 Pages, (Dec. 2011).

(Continued)

*Primary Examiner* — Nathan Taylor
(74) *Attorney, Agent, or Firm* — Oblon, Spivak, McClelland, Maier & Neustadt, L.L.P.

(57) ABSTRACT

A home radio base station according to the present invention includes a receiving unit 11 configured to receive notification information in peripheral cells of the same radio communication scheme as that of the home radio base station, an acquiring unit 12 configured to acquire operational frequencies in the same radio communication scheme as that of the home radio base station, from the received notification information, and a determining unit 13 configured to determine an operational frequency for the home radio base station, from the acquired operational frequencies.

3 Claims, 9 Drawing Sheets

(56) References Cited

U.S. PATENT DOCUMENTS

2011/0003597 A1* 1/2011 Budic et al. .................. 455/450
2011/0081915 A1* 4/2011 Maida et al. .................. 455/450
2012/0127954 A1* 5/2012 Lim et al. ..................... 370/330

FOREIGN PATENT DOCUMENTS

| WO | 2008 121037 | 10/2008 |
| WO | 2008 137417 | 11/2008 |
| WO | 2009 049195 | 4/2009 |

OTHER PUBLICATIONS

3GPP TS 25.214 V11.2.0, "$3^{rd}$ Generation Partnership Project; Technical Specification Group Radio Access Network; Physical layer procedures (FDD)," Total 108 Pages, (Jun. 2012).

Japanese Office Action Issued Sep. 27, 2011 in JP 2009 258276 Filed Nov. 11, 2009 (with English translation).

International Search Report Issued Feb. 1, 2011 in PCT/JP10/69943 Filed Nov. 9, 2010.

* cited by examiner

|  | SYSTEM FREQUENCY INFORMATION[MHz] |
|---|---|
| W-CDMA SCHEME | 2120 |
| | 2140 |
| | ... |
| LTE SCHEME | 2160 |
| | 2180 |
| | ... |

MOBILE COMMUNICATION SYSTEM, HOME RADIO BASE STATION, AND OPERATIONAL FREQUENCY DETERMINATION METHOD

TECHNICAL FIELD

The present invention relates to a mobile communication system, a home radio base station, and an operational frequency determination method.

BACKGROUND ART

In an existing mobile communication system, a public-communication radio base station NodeB/eNB needs to perform complicated system design and system evaluation in order to meet required service quality of a communication start request from a mobile station UE, which is irregularly made.

For example, as the system design, there is assumed an operation to predict traffic by means such as simulation and the like, to design an arrangement and a configuration of a public-communication radio base station NodeB/eNB, and to design radio parameters such as a power transmission level and a frequency to be used in a downlink common control channel which is transmitted by the public-communication radio base station NodeB/eNB, before construction of the public-communication radio base station NodeB/eNB.

In addition, as the system evaluation, there is assumed an operation to perform actual measurement, maintenance and management and the like on the communication quality or system capacity in each service area on a regular basis, after the construction of the public-communication radio base station NodeB/eNB.

Such operations are performed on public-communication radio base stations NodeB/eNB. It is expected, however, that similar operations are basically performed also on radio base stations placed in small areas such as homes, which are referred to as home radio base stations HNB (Home NodeB)/HeNB (Home eNB).

PRIOR ART DOCUMENTS

Non-Patent Documents

Non-Patent Document 1: 3GPP TS22.220
Non-Patent Document 2: 3GPP TS22.214

Patent Document

Patent Document 1: Japanese Patent Application Publication No. Hei 8-23566

SUMMARY OF THE INVENTION

However, since the home radio base station HNB/HeNB is flexibly installed in a small area such as a home, it is expected that a very large number of home radio base stations HNB/HeNB are installed, compared with the public-communication radio base station NodeB/eNB. Thus, a huge amount of effort is made for the above-described system design and system evaluation.

In an area where households are concentrated, such as an apartment building, in particular, it is expected that the home radio base stations HNB/HeNB are concentrically installed, thus making the above-described system design and system evaluation very complicated.

Hence, it is assumed that, in the home radio base station HNB/HeNB, a method for autonomously setting radio parameters, which is referred to as "Self Configuration," is adopted.

For example, the home radio base station HNB/HeNB in which the "Self Configuration" is adopted is configured to avoid any interference from peripheral radio base stations by selecting a frequency allowing the minimum reception level from frequencies of radio signals to be transmitted by peripheral radio base stations (peripheral cells), as an operational frequency out of the radio parameters.

A mobile communication carrier generally operates a mobile communication system accommodating radio access networks of multiple radio communication schemes such as 3G/3.9G (LTE: Long Term Evolution) scheme and the like.

Now, since the home radio base station HNB/HeNB is assumed to be purchased by a subscriber, a device cost is requested to be as low as possible. For this reason, it is assumed that the home radio base station HNB/HeNB supports only part of radio communication schemes of the multiple radio communication schemes.

Thus, in a mobile communication system in which radio access networks of multiple radio communication schemes coexist, there is a problem that a home radio base station HNB/HeNB which supports only part of the radio communication schemes cannot measure reception levels of radio signals transmitted by peripheral cells, and thus cannot autonomously select an appropriate operational frequency.

Hence, the present invention has been made in view of the above-described problem, and an objective of the present invention is to provide a mobile communication system, a home radio base station, and an operational frequency determination method which enable a home radio base station supporting only some radio communication schemes to autonomously select an appropriate operational frequency.

The first feature of the present invention is summarized in that a mobile communication system in which a plurality of radio access networks using radio communication schemes coexist and which comprises a plurality of public-communication radio base stations and a home radio base station, wherein each of the public-communication radio base stations comprises a notification information transmitting unit configured to transmit notification information including operational frequencies in all the radio communication schemes in cells under control, and the home radio base station includes: a notification information receiving unit configured to receive notification information in peripheral cells of the same radio communication scheme as that of the home radio base station; an acquiring unit configured to acquire operational frequencies in the same radio communication scheme as that of the home radio base station, from the received notification information, and a determining unit configured to determine an operational frequency for the home radio base station, from the acquired operational frequencies.

The second feature of the present invention is summarized in that a home radio base station to be used in a mobile communication system in which radio access networks of a plurality of radio communication schemes coexist, the home radio base station including: a notification information receiving unit configured to receive notification information in peripheral cells of the same radio communication scheme as that of the home radio base station; an acquiring unit configured to acquire operational frequencies in the same radio communication scheme as that of the home radio base station, from the received notification information; and a determining unit configured to determine an operational frequency for the home radio base station, from the acquired operational frequencies.

The third feature of the present invention is summarized in that an operational frequency determination method for autonomously determining an operational frequency for a home radio base station in a mobile communication system in which radio access networks of a plurality of radio communication schemes coexist, the operational frequency determination method including: a step A of causing each of public-communication radio base stations in the mobile communication system to transmit notification information including operational frequencies in all the radio communication schemes in cells under control; a step B of causing the home radio base station to receive notification information in peripheral cells of the same radio communication scheme as that of the home radio base station; a step C of causing the home radio base station to acquire operational frequencies in the same radio communication scheme as that of the home radio base station, from the received notification information; and a step D of causing the home radio base station to determine an operational frequency for the home radio base station, from the acquired operational frequencies.

MODES FOR CARRYING OUT THE INVENTION (Configuration of Mobile Communication System According to First Embodiment of the Present Invention)

Figure 1:
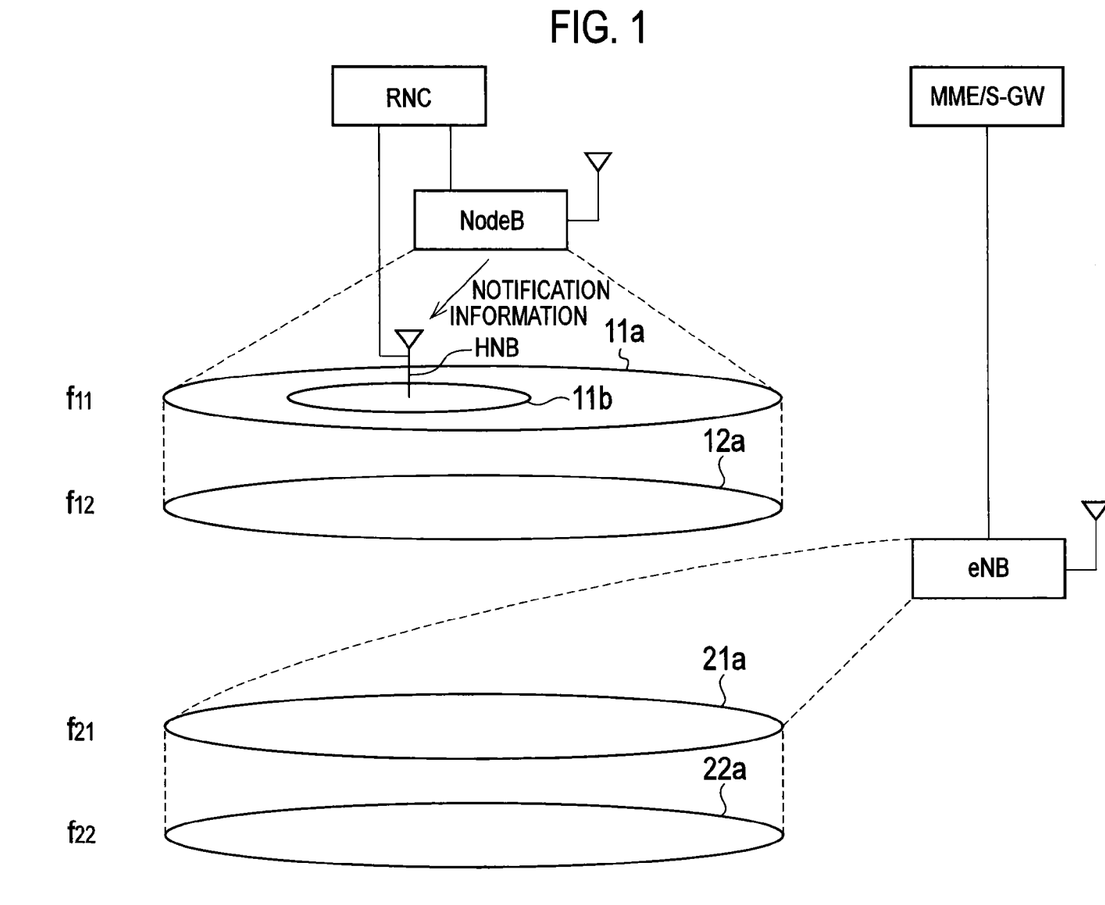
FIG. 1 is an overall configuration diagram of a mobile communication system according to a first embodiment of the present invention.
Figure 2:
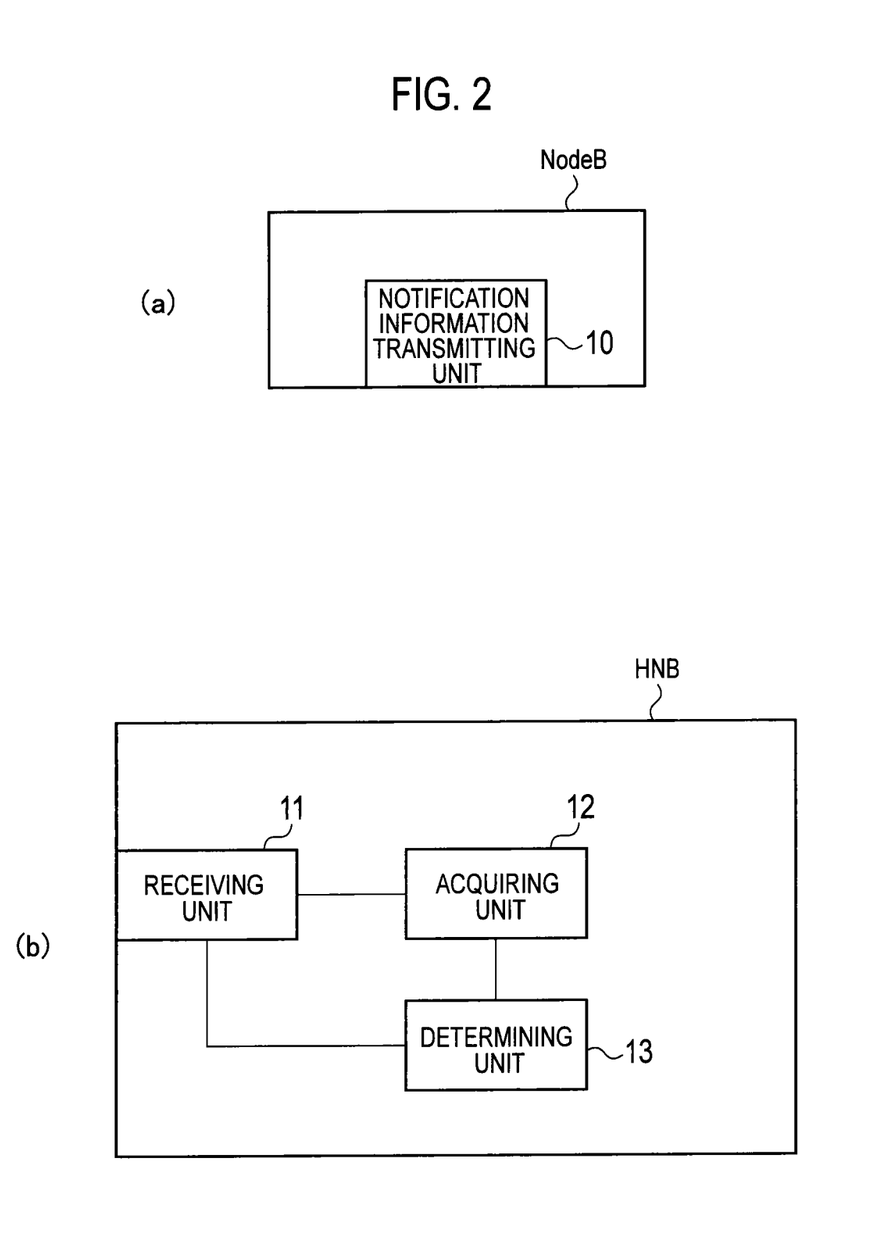
FIG. 2 is functional block diagrams of a public-communication radio base station and a home radio base station according to the first embodiment of the present invention.
Figure 3:
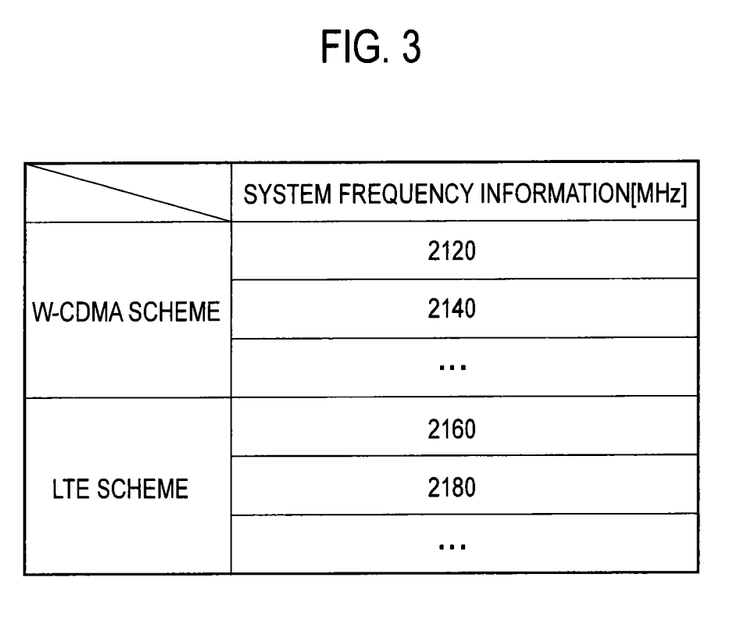
FIG. 3 is a view showing one example of system frequency information to be acquired by the home radio base station according to the first embodiment of the present invention.

With reference to FIG. 1 to FIG. 3, a configuration of a mobile communication system according to a first embodiment of the present invention will be described.

As shown in FIG. 1, a radio access network of W-CDMA (3G) scheme and a radio access network of LTE (3.9G) scheme coexist in the mobile communication system according to the embodiment.

In the mobile communication system according to the embodiment, the radio access network of the W-CDMA scheme includes a public-communication radio base station NodeB, a home radio base station HNB, and a radio network controller RNC, and the radio access network of the LTE scheme includes a public-communication radio base station eNB. The public-communication radio base station eNB is housed in an exchange MME (Mobility Management Entity)/S-GW (Serving Gateway).

In addition, the public-communication radio base station NodeB manages multiple public-communication cells (or, referred to as public cells or macrocells) $11a$, $12a$, the public-communication radio base station eNB manages multiple public-communication cells $21a$, $22a$, and the home radio base station HNB manages a single home cell $11b$.

Note that, while an unspecified number of mobile stations UE can reside in and communicate with the public-communication cells, only specified mobile stations can be resident in and communicate with the home cell.

In addition, in the example of FIG. 1, 4 operational frequencies f11, f12, f21, f22 are used in the mobile communication system according to the embodiment. The operational frequency f11 is used in the public-communication cell $11a$ and the home cell $11b$, the operational frequency f12 is used in the public-communication cell $12a$, the operational frequency f21 is used in the public-communication cell $21a$, and the operational frequency f22 is used in the public-communication cell $22a$. Note that, in the embodiment, it is assumed for simplicity that an "omni-cell" is used as the public-communication cells and the home cell. The "omni-cell" is a cell having no sector structure, and covering a range of 360 degrees.

Note that, in the embodiment, a configuration in which a home radio base station is installed in a radio access network of the W-CDMA scheme is described. However, the present invention is not limited to the configuration, and also applicable to a configuration in which a home radio base station is installed in a radio access network of the LTE scheme, as described below.

As shown in Part (a) of FIG. 2, the public-communication radio base station NodeB according to the embodiment includes a notification information transmitting unit 10.

The notification information transmitting unit 10 is configured to transmit notification information including system frequency information which indicates operational frequencies of all the radio communication schemes (the W-CDMA scheme and the LTE scheme in the embodiment) in cells under control. FIG. 3 shows one example of the system frequency information.

As shown in Part (b) of FIG. 2, the home radio base station HNB according to the embodiment includes a receiving unit 11, an acquiring unit 12, and a determining unit 13.

The receiving unit 11 is configured to receive radio signals, for example notification information, in peripheral cells of the same radio communication scheme as that of the home radio base station.

The receiving unit 11 is also configured to measure reception levels of radio signals, for example, reception levels of common control channel signals (for example, sum values of reception levels of the common control channel signals in respective frequencies) in the peripheral cells of the same radio communication scheme as that of the home radio base station.

For example, the receiving unit 11 may measure "RSCP (Received Signal Code Power)" as the reception levels of the common control channel signals in the cell of the W-CDMA scheme, and may measure "RSRP (Reference Signal Received Power)" as the reception levels of the common control channel signals in the cell of the LTE scheme.

In addition, the receiving unit 11 may also be configured to receive radio signals from peripheral cells in which frequencies of operational frequency candidates determined by the determining unit 13 to be described below are used.

The acquiring unit 12 is configured to acquire operational frequencies of the same radio communication scheme as that of the home radio base station, from the system frequency information contained in the notification information received by the receiving unit 11.

The determining unit 13 is configured to determine an operational frequency for the home radio base station from the operational frequencies (operational frequency candidates) acquired by the acquiring unit 12.

Here, the determining unit 13 may be configured to store, as the operational frequency candidate, the operational frequency of the same radio communication scheme as that of the home radio base station, which is acquired by the acquiring unit 12, and to determine an operational frequency for the home radio base station, on the basis of reception levels of common control channel signals (sum values of reception levels of the common control channel signals of respective frequencies) transmitted in peripheral cells of the operational frequency candidate.

(Operation of Mobile Communication System According to First Embodiment of the Present Invention)

The operation of the mobile communication system according to the first embodiment of the present invention, specifically, the operation of the home radio base station HNB according to the first embodiment of the present invention will be described with reference to FIG. 4.

Figure 4:
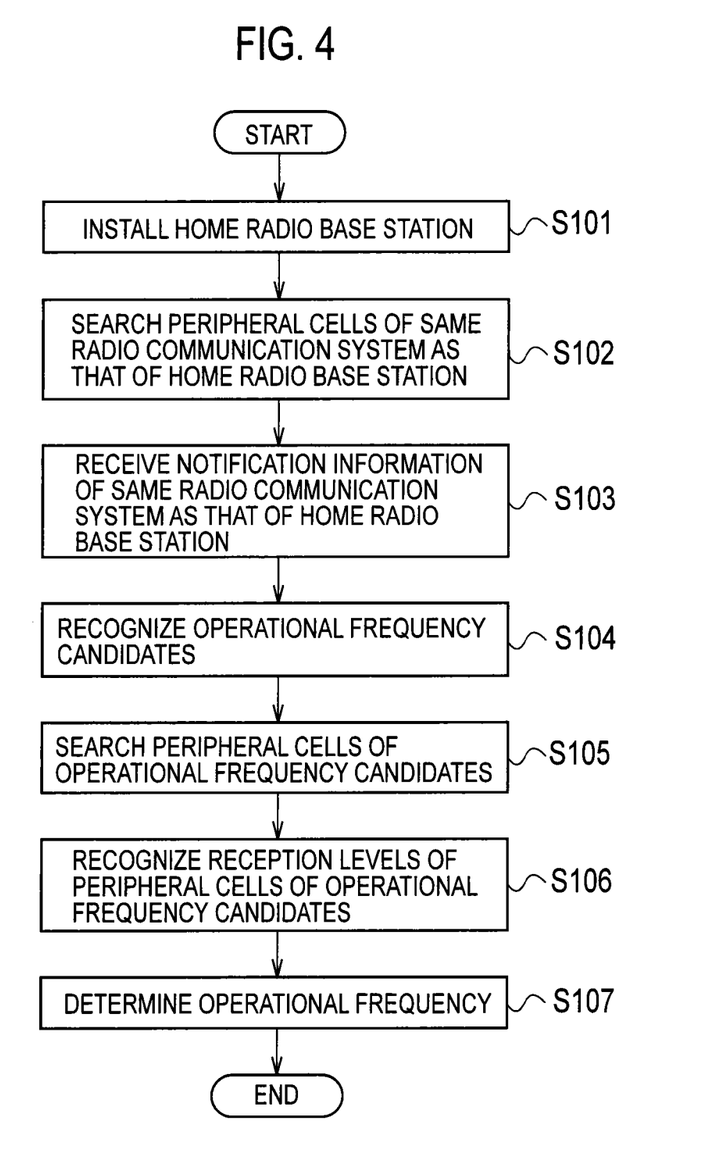
FIG. 4 is a flowchart showing operation of the home radio base station according to the first embodiment of the present invention.

As shown in FIG. 4, when installed instep S101, the home radio base station HNB searches peripheral cells of the same radio communication scheme as that of the home radio base station (the W-CDMA scheme in the embodiment) in step S102, and receives notification information transmitted from the radio network controller RNC via the radio base station NodeB in step S103.

In step S104, the home radio base station HNB recognizes operational frequencies in the radio access network of the same radio communication scheme as that of the home radio base station, on the basis of system frequency information (see FIG. 2, for example) contained in the received notification information, and stores the operational frequencies as the operational frequency candidates.

The home radio base station HNB searches the peripheral cells of the stored operational frequency candidates in step S105, measures sum values of reception levels of common control channel signals in respective frequencies transmitted in the peripheral cells of the operational frequency candidates in step S106, and determines an operational frequency for the home radio base station on the basis of the sum value in step S107.

Here, for example, the home radio base station HNB may select a frequency of the minimum sum value of the above-described sum values, as an operational frequency.

In addition, the home radio base station HNB may select one frequency from the operational frequency candidates, consider that the frequency meets requirements even if there remain unmeasured operational frequency candidates when a sum value of the reception levels of the common control channel signals in the frequency falls below a predetermined threshold value, and determine the frequency as an operational frequency.

(Operation and Effect of Mobile Communication System According to First Embodiment of the Present Invention)

With the mobile communication system according to the first embodiment of the present invention, in a mobile communication system in which a radio access network of W-CDMA scheme and a radio access network of LTE scheme coexist, a system information block referred to as SIB19 of notification information (System Information) of the W-CDMA scheme enables notification of operational frequencies of the W-CDMA scheme and the LTE scheme used in a specific area. For this reason, by reading the above-described SIB19, a home radio base station HNB having the function of receiving only radio signals of the W-CDMA scheme can select an appropriate operational frequency of the W-CDMA scheme based on an interference level of radio signals of the W-CDMA scheme, as operational frequency candidates.

In addition, when the home radio base station HNB selects an operational frequency on the basis of total received power within frequency bands, which is referred to RSSI (Received Signal Strength Indicator), measurement result of RSSI widely varies, depending on factors of the number of mobile stations UE and communication status at the timing of measuring the RSSI. Thus, in order to follow the variation and select an operational frequency, the home radio base station HNB needs to perform measurements of RSSI frequently.

In contrast, with the mobile communication system according to the first embodiment of the present invention, since the home radio base station HNB determines an operational frequency on the basis of reception levels of common control channel signals which depends on a coverage referred to as RSCP in the W-CDMA scheme or RSRP in the LTE scheme, the frequency of measurements for selecting an operational frequency can be reduced.

For example, with the mobile communication system according to the first embodiment of the present invention, the home radio base station HNB can reduce the frequency of measurements for selecting the operational frequency described above to about once a day, for example, such as "at the time of addition, removal, or relocation of a frequency cell," or to a "frequency at which a change in surrounding buildings may occur."

(Modification 1)

Modification 1 of the mobile communication system according to the above-described first embodiment will be described with reference to FIG. 5. In the following, the mobile communication system according to Modification 1 will be described, focusing on difference from the mobile communication system according to the above-described first embodiment.

Figure 5:
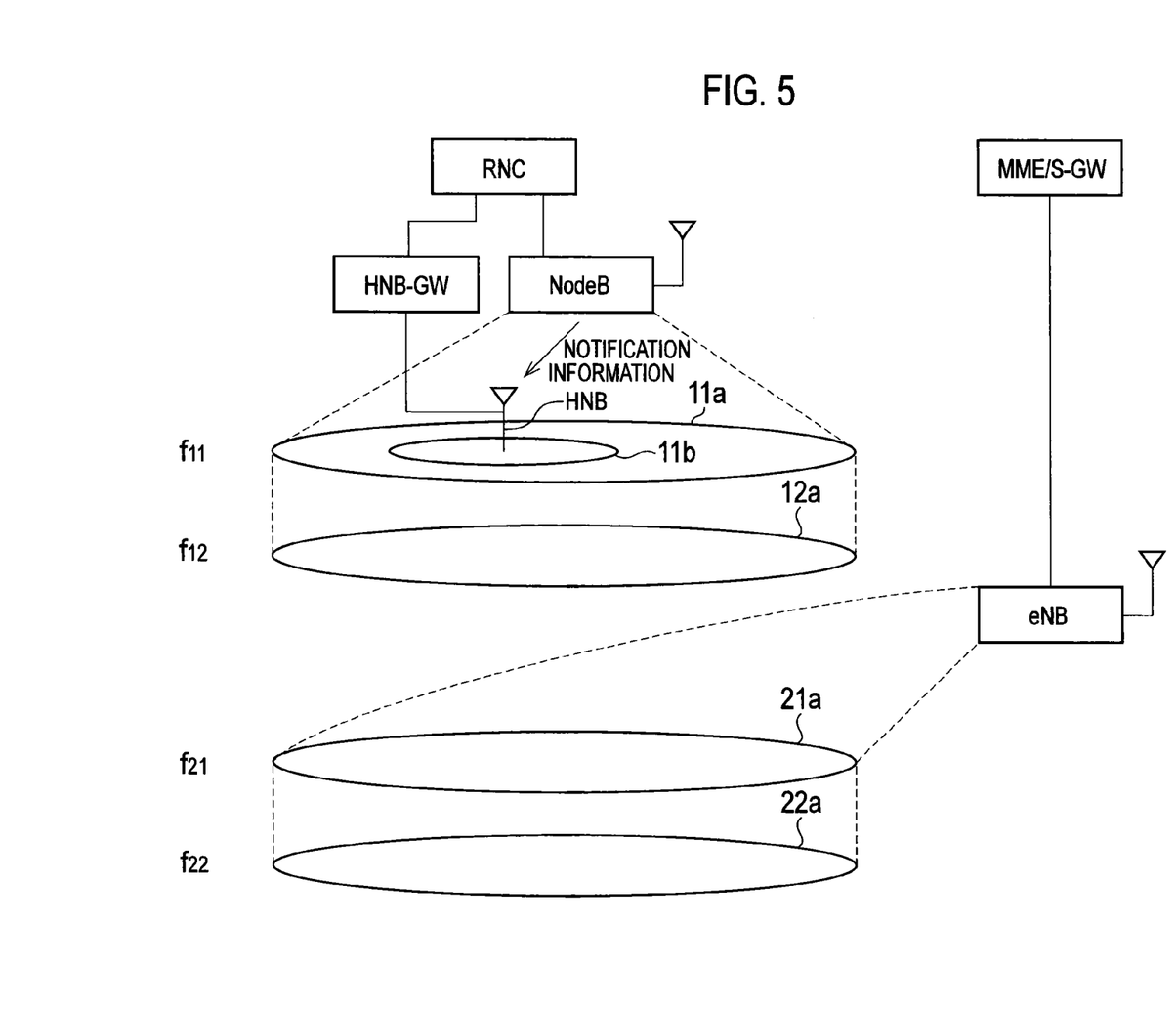
FIG. 5 is an overall configuration diagram of a mobile communication system according to Modification 1 of the present invention.

As shown in FIG. 5, in the mobile communication system according to Modification 1, a home radio base station HNB is housed in a gateway device HNB-GW but not in the radio network controller RNC.

(Modification 2)

Modification 2 of the mobile communication system according to the above-described second embodiment will be described with reference to FIG. 6. In the following, the mobile communication system according to Modification 2 will be described, focusing on difference from the mobile communication system according to the above-described first embodiment.

Figure 6:
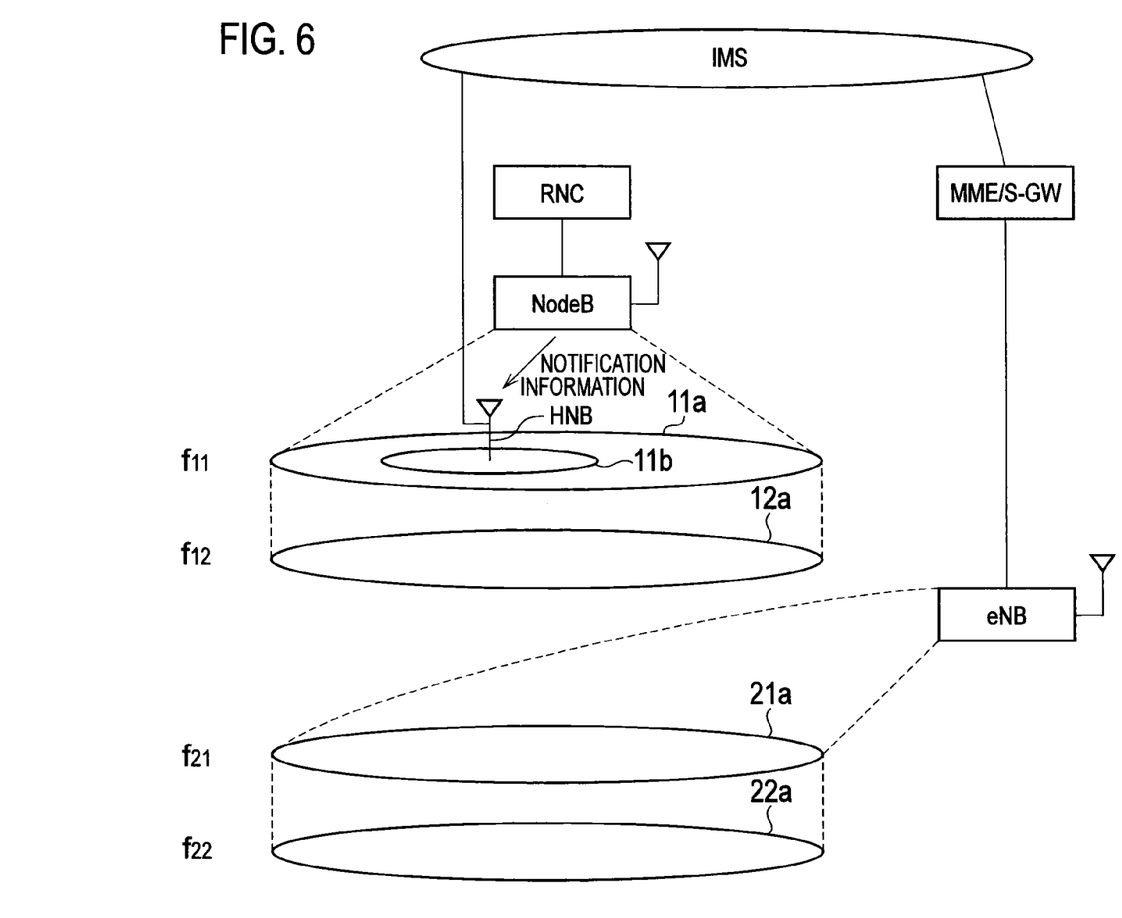
FIG. 6 is an overall configuration diagram of a mobile communication system according to Modification 2 of the present invention.

As shown in FIG. 6, in the mobile communication system according to Modification 2, a home radio base station HNB is housed in an IMS (IP Multimedia Subsystem) but not in the radio network controller RNC.

(Modification 3)

Figure 7:
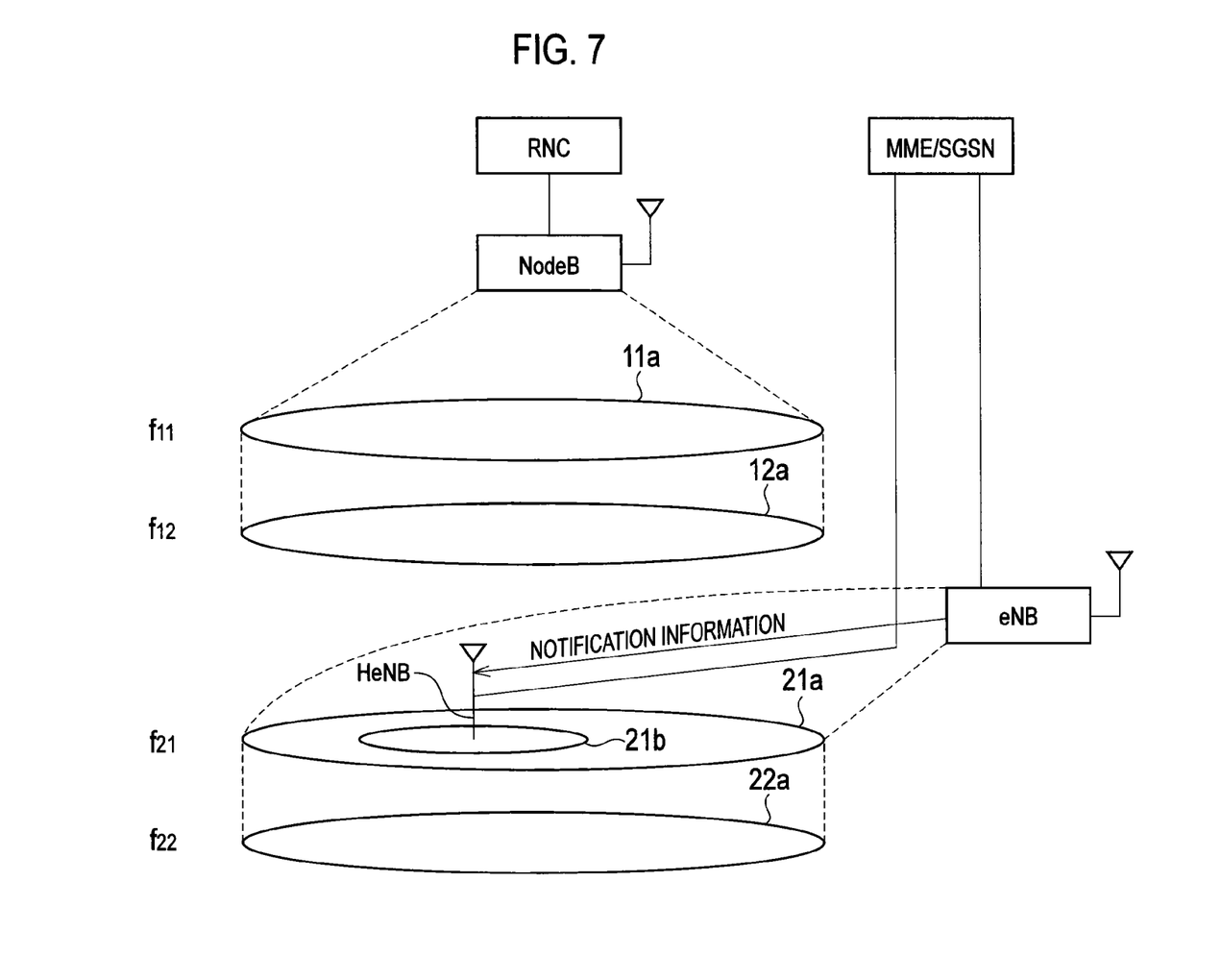
FIG. 7 is an overall configuration diagram of a mobile communication system according to Modification 3 of the present invention.

Modification 3 of the mobile communication system according to the above-described first embodiment will be described with reference to FIG. 7. In the following, the mobile communication system according to Modification 3 will be described, focusing on difference from the mobile communication system according to the above-described first embodiment.

In the mobile communication system according to Modification 3, a radio access network of the W-CDMA scheme includes a public-communication radio base station NodeB and a radio network controller RNC, and a radio access network of the LTE scheme includes a public-communication radio base station eNB and a home radio base station HeNB. The public-communication radio base station eNB and the home radio base station HeNB are housed in an exchange MME/S-GW.

In addition, the home radio base station HeNB manages a single home cell 21b. Note that, the configuration of the home radio base station HeNB is basically identical to the configuration of the home radio base station HNB as shown in Part (b) of FIG. 2 described above.

(Modification 4)

Modification 4 of the mobile communication system according to the above-described first embodiment will be described with reference to FIG. 8. In the following, the mobile communication system according to Modification 4 will be described, focusing on difference from the mobile communication system according to Modification 3 described above.

Figure 8:
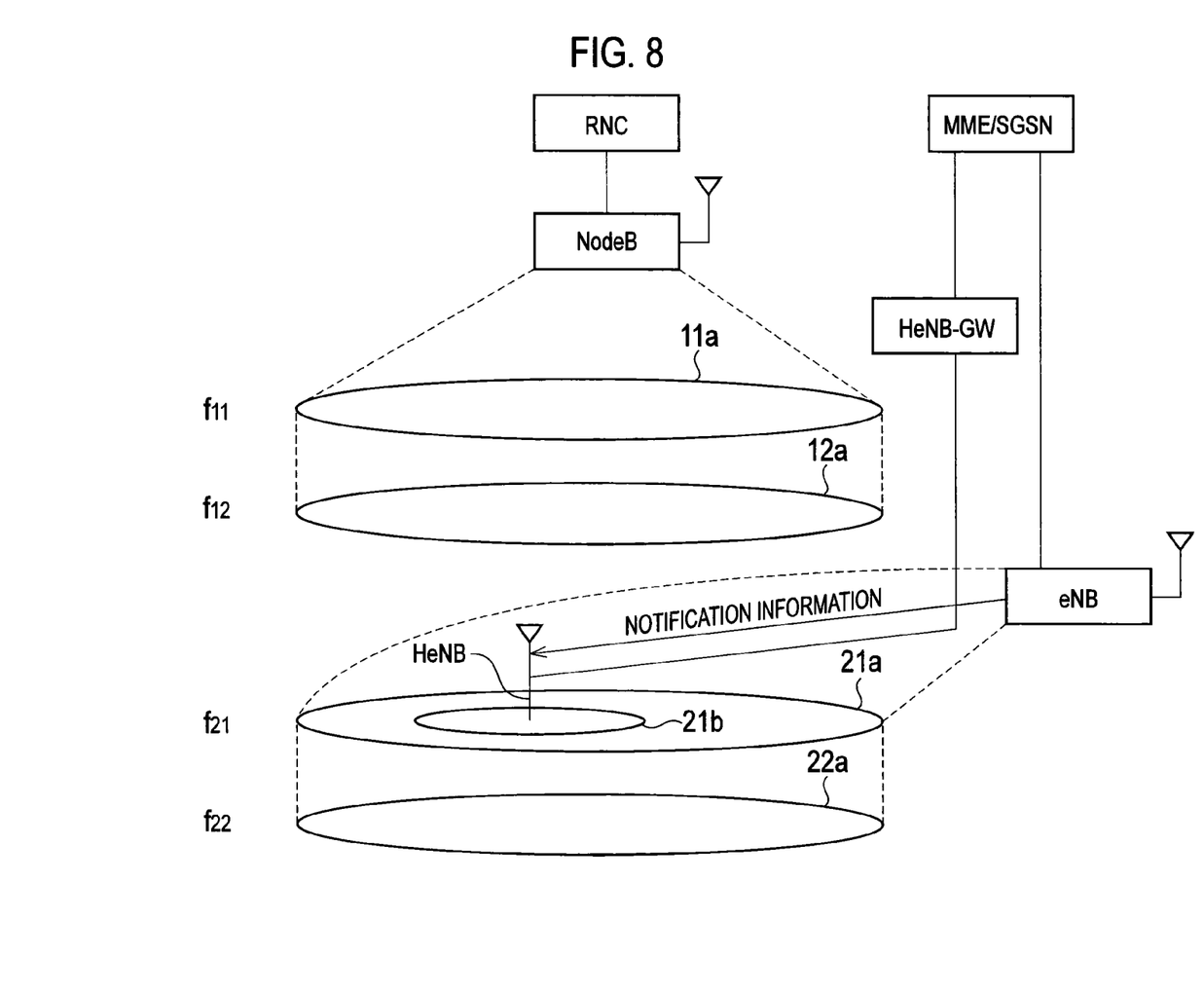
FIG. 8 is an overall configuration diagram of a mobile communication system according to Modification 4 of the present invention.

As shown in FIG. 8, with the mobile communication system according to Modification 4, a home radio base station HeNB is housed in a gateway device HeNB-GW but not in the switching center MME/S-GW.

(Modification 5)

Modification 5 of the mobile communication system according to the above-described first embodiment will be described with reference to FIG. 9. In the following, the mobile communication system according to Modification 5 will be described, focusing on difference from the mobile communication system according to Modification 3 described above.

Figure 9:
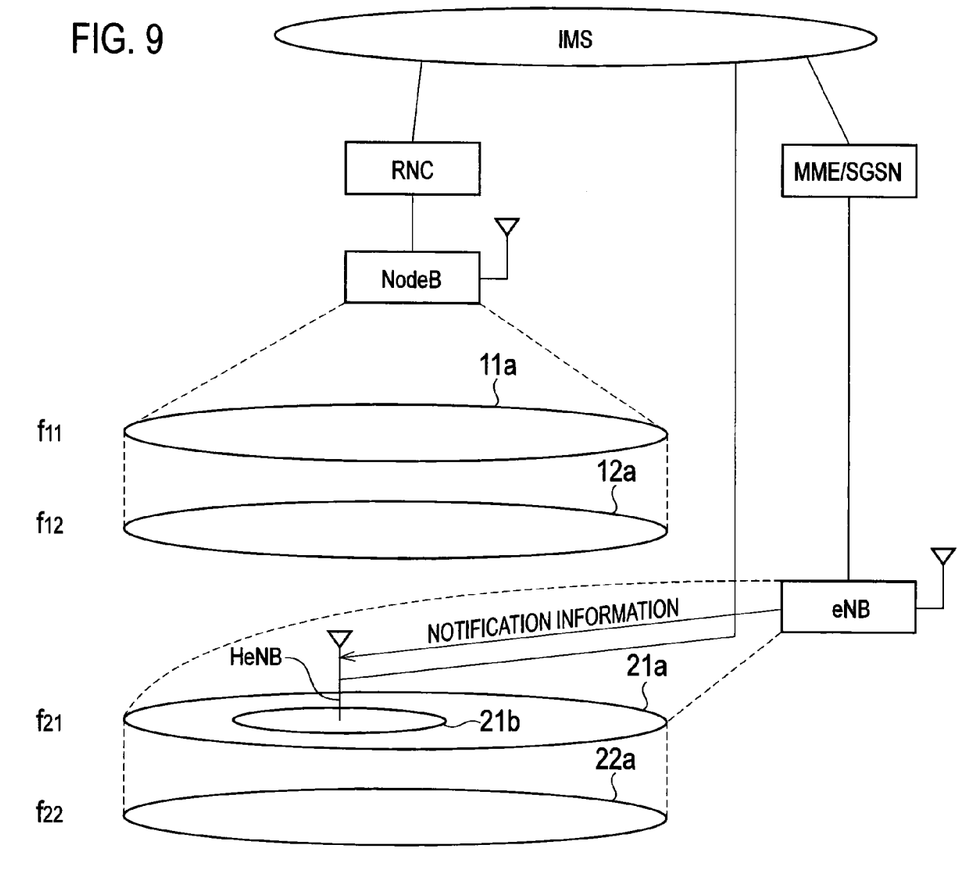
FIG. 9 is an overall configuration diagram of a mobile communication system according to Modification 5 of the present invention.

As shown in FIG. 9, in the mobile communication system according to Modification 4, the home radio base station HeNB is housed in an IMS but not in the switching center MME/S-GW.

The characteristics of the above-described embodiments may be expressed as follows.

A first characteristic of the embodiment is summarized as a mobile communication system in which a radio access network of W-CDMA scheme and a radio access network of a LTE scheme (radio access networks of multiple radio communication schemes) coexist and which includes multiple public-communication radio base stations NodeB/eNB and home radio base stations HNB/HeNB, in which each of the public-communication radio base stations NodeB/eNB includes a notification information transmitting unit 10 configured to transmit notification information including operational frequencies in all radio communication schemes in cells under control, and the home radio base station HNB/HeNB includes a receiving unit 11 configured to receive notification information in peripheral cells of the same radio communication scheme as that of the home radio base station, an acquiring unit 12 configured to acquire operational frequencies in the same radio communication scheme as that of the home radio base station, from the received notification information, and a determining unit 13 configured to determine an operational frequency for the home radio base station, from the acquired operational frequencies.

In the first characteristic of the embodiment, the determining unit 13 may be configured to determine an operational frequency for the home radio base station, on the basis of reception levels of common control channel signals transmitted in the peripheral cells of the acquired operational frequencies.

A second characteristic of the present invention is summarized as a home radio base station HNB/HeNB to be used in a mobile communication system in which a radio access network of W-CDMA scheme and a radio access network of LTE scheme coexist, the home radio base station including a receiving unit 11 configured to receive notification information in peripheral cells of the same radio communication scheme as that of the home radio base station; an acquiring unit 12 configured to acquire operational frequencies in the same radio communication scheme as that of the home radio base station, from the received notification information; and a determining unit 13 configured to determine an operational frequency for the home radio base station, from the acquired operational frequencies.

In the second characteristic of the embodiment, the determining unit 13 may be configured to determine an operational frequency for the home radio base station, on the basis of reception levels of common control channel signals transmitted in the peripheral cells of the acquired operational frequencies.

A third characteristic of the present invention is summarized as an operational frequency determination method for autonomously determining an operational frequency for a home radio base station HNB/HeNB in a mobile communication system in which a radio access network of W-CDMA scheme and a radio access network of LTE scheme coexist, the operational frequency determination method including: a step A of causing each of public-communication radio base stations NodeB/eNB in the mobile communication system to transmit notification information including operational frequencies in all the radio communication schemes in cells under control; a step B of causing the home radio base station HNB/HeNB to receive notification information in peripheral cells of the same radio communication scheme as that of the home radio base station; a step C of causing the home radio base station HNB/HeNB to acquire operational frequencies in the same radiocommunication scheme as that of the home radio base station, from the received notification information; and a step D of causing the home radio base station HNB/HeNB to determine an operational frequency for the home radio base station, from the acquired operational frequencies.

In the third characteristic of the embodiment, in the step D, the home radio base station HNB/HeNB may determine an operational frequency for the home radio base station on the basis of reception levels of common control channel signals transmitted in the peripheral cells of the acquired operational frequencies.

Note that the operation of HeNB, HNB, NodeB, eNB, RNC, MME/S-GW described above may be performed by hardware, a software module executed by a processor, or a combination thereof.

The software module may be provided in a storage medium of any format such as a RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

The storage medium is connected to the processor so that the processor can read and write information from/into the storage medium. In addition, the storage medium may be integrated in the processor. Furthermore, the storage medium and processor may be provided in an ASIC. The ASIC may be provided in HeNB, HNB, NodeB, eNB, RNC, MME/S-GW.

In addition, the storage medium and processor may be provided in HeNB, HNB, NodeB, eNB, RNC, and MME/S-GW as a discrete component.

Although the present invention has been described in detail by using the above-described embodiments, it is apparent to those skilled in the art that the present invention is not limited to the embodiments described in the description. The present invention can be modified and carried out as a modification, without departing from the gist and scope of the present invention which are defined by the description in the scope of claims. Therefore, the description herein is intended to provide an exemplary description, and not to have any limiting meaning to the present invention. Therefore, the description herein is intended to provide an exemplary description, and not to have any limiting meaning to the present invention.

Note that Japanese Patent Application No. 2009-258276 (filed on Nov. 11, 2009) is incorporated herein by reference in its entirety.

INDUSTRIAL APPLICABILITY

With the present invention, when radio access networks of multiple radio communication schemes coexist, a home radio base station which can only support part of the radio communication schemes can autonomously select an appropriate operational frequency. Therefore, the present invention is useful in radio communications and the like.

EXPLANATION OF THE REFERENCE NUMERALS

NodeB, eNB public-communication radio base station
10 notification information transmitting unit
HNB, HeNB home radio base station
11 receiving unit
12 acquiring unit
13 determining unit

The invention claimed is:

1. A mobile communication system in which a plurality of radio access networks using radio communication schemes coexist and which comprises a plurality of public-communication radio base stations and a home radio base station, wherein each of the public-communication radio base stations comprises a communication interface configured to transmit notification information including operational frequencies in all the radio communication schemes in cells under control of each public-communication radio base station, and the home radio base station comprises circuitry configured to:

receive notification information in peripheral cells of the same radio communication scheme as that of the home radio base station;

acquire operational frequencies in the same radio communication scheme as that of the home radio base station, from the received notification information; and determine an operational frequency for the home radio base station, from the acquired operational frequencies on the basis of reception levels of common control channel signals transmitted in the peripheral cells of the acquired operational frequencies.

2. A home radio base station to be used in a mobile communication system in which radio access networks of a plurality of radio communication schemes coexist, the home radio base station comprising:

circuitry configured to receive notification information in peripheral cells of the same radio communication scheme as that of the home radio base station;

acquire operational frequencies in the same radio communication scheme as that of the home radio base station, from the received notification information; and determine an operational frequency for the home radio base station, from the acquired operational frequencies on the basis of reception levels of common control channel signals transmitted in the peripheral cells of the acquired operational frequencies.

3. An operational frequency determination method for autonomously determining an operational frequency for a home radio base station in a mobile communication system in which radio access networks of a plurality of radio communication schemes coexist, the operational frequency determination method comprising:

causing each public-communication radio base station in the mobile communication system to transmit notification information including operational frequencies in all the radio communication schemes in cells under control of each public-communication radio base station;

causing the home radio base station to receive notification information in peripheral cells of the same radio communication scheme as that of the home radio base station;

causing the home radio base station to acquire operational frequencies in the same radio communication scheme as that of the home radio base station, from the received notification information; and causing the home radio base station to determine an operational frequency for the home radio base station, from the acquired operational frequencies on the basis of reception levels of common control channel signals transmitted in the peripheral cells of the acquired operational frequencies.

* * * * *